US008836336B2

(12) United States Patent
Campbell et al.

(10) Patent No.: US 8,836,336 B2
(45) Date of Patent: Sep. 16, 2014

(54) COMBINING DIFFERENT ELECTROMAGNETIC DATA TO CHARACTERIZE A SUBTERRANEAN STRUCTURE

(75) Inventors: Tracy Campbell, Baku (AZ); Jostein Kjerstad, Stavanger (NO); Graham Paterson Birkett, Houston, TX (US)

(73) Assignees: WesternGeco L.L.C., Houston, TX (US); PetroMarker A.S.

( * ) Notice: Subject to any disclaimer, the term of this patent is extended or adjusted under 35 U.S.C. 154(b) by 417 days.

(21) Appl. No.: 13/208,689

(22) Filed: Aug. 12, 2011

(65) Prior Publication Data

US 2012/0112752 A1 May 10, 2012

Related U.S. Application Data

(60) Provisional application No. 61/373,156, filed on Aug. 12, 2010.

(51) Int. Cl.
*G01V 3/02* (2006.01)
*G01V 3/12* (2006.01)
*G01V 3/08* (2006.01)

(52) U.S. Cl.
CPC . *G01V 3/12* (2013.01); *G01V 3/083* (2013.01)
USPC ........................................................ 324/365

(58) Field of Classification Search
USPC ................................................ 324/365, 345
See application file for complete search history.

(56) References Cited

U.S. PATENT DOCUMENTS

| | | | |
|---|---|---|---|
| 7,400,977 B2 * | 7/2008 | Alumbaugh et al. | 702/7 |
| 7,949,470 B2 | 5/2011 | Alumbaugh | |
| 8,008,921 B2 | 8/2011 | Alumbaugh et al. | |
| 8,275,592 B2 | 9/2012 | Lovatini | |
| 8,378,685 B2 | 2/2013 | Morrison | |
| 8,570,044 B2 | 10/2013 | Tompkins | |
| 2007/0145980 A1 | 6/2007 | Conti et al. | |
| 2008/0239875 A1 * | 10/2008 | Alumbaugh et al. | 367/131 |
| 2009/0132166 A1 * | 5/2009 | Alumbaugh et al. | 702/2 |
| 2009/0254320 A1 * | 10/2009 | Lovatini et al. | 703/5 |
| 2009/0315539 A1 * | 12/2009 | Helwig et al. | 324/149 |
| 2010/0102821 A1 * | 4/2010 | Alumbaugh et al. | 324/334 |
| 2010/0225324 A1 * | 9/2010 | Strack et al. | 324/365 |
| 2010/0231220 A1 * | 9/2010 | Alumbaugh et al. | 324/338 |
| 2011/0210743 A1 | 9/2011 | Tompkins et al. | |

FOREIGN PATENT DOCUMENTS

| | | |
|---|---|---|
| WO | 2007053025 A1 | 5/2007 |
| WO | 2007105956 A1 | 9/2007 |
| WO | 2008066389 A1 | 6/2008 |
| WO | 2009082236 A1 | 7/2009 |
| WO | 2010041959 A1 | 4/2010 |

OTHER PUBLICATIONS

Abubakar, et al., "Joint MT and CSEM Data Inversion Using a Multiplicative Cost Function Approach", Geophysics, vol. 76(3), May 2011, pp. F203-F214.

(Continued)

*Primary Examiner* — Jay Patidar

(57) ABSTRACT

First electromagnetic data is acquired for a subterranean structure using a first survey technique, and second electromagnetic data is acquired for the subterranean structure using a second, different survey technique in which static positioning of at least one electromagnetic source is employed. The first and second electromagnetic data are combined to characterize the subterranean structure.

19 Claims, 7 Drawing Sheets

(56) References Cited

OTHER PUBLICATIONS

Alumbaugh, et al., "Comparison of Sensitivity and Resolution with Two Marine CSEM Exploration Methods", SEG Annual Meeting, Denver, Colorado, Oct. 17-22, 2010, 5 pages.

Alumbaugh, et al., "Fast two-dimensional forward and inversion algorithms for interpreting marine CSEM data", Offshore Technology Conference, Houston, Texas, May 14, 2006, 11 pages.

Colombo, et al., "Geophysical Modeling Via Simultaneous Joint Inversion of Seismic Gravity, and Electromagnetic Data: Application to Prestack Depth Imaging", The Leading Edge, vol. 26 (3), Mar. 2007, pp. 326-331.

De Stefano, et al., "Multiple-domain, simultaneous joint inversion of geophysical data with application to subsalt imaging", Geophysics, vol. 76 (3), May 2011, pp. R69-R80.

Liang, et al., "Feasibility Study of Marine CSEM for Reservoir Monitoring Using Joint 3D EM Modeling and Fluids Flow Simulator", 73rd EAGE Conference and Exhibition, May 23, 2011, 5 pages.

Mackie, et al., "Joint 3D Inversion of marine CSEM and MT Data", Extended Abstracts, SEG Annual Meeting, 2007, pp. 574-578.

Mackie, et al., "Three-dimensional magnetotelluric inversion using conjugate gradients", Geophysical Journal International, vol. 115 (1), Oct. 1993, pp. 215-229.

\* cited by examiner

COMBINING DIFFERENT ELECTROMAGNETIC DATA TO CHARACTERIZE A SUBTERRANEAN STRUCTURE

CROSS REFERENCE TO RELATED APPLICATIONS

This application claims the benefit under 35 U.S.C. §119 (e) of U.S. Provisional Application Ser. No. 61/373,156 entitled "COMBINED HORIZONTAL AND VERTICAL CONTROLLED SOURCE ELECTROMAGNETIC GEOPHYSICAL SURVEYING AND INVERSION MODELING," filed Aug. 12, 2010,which is hereby incorporated by reference.

BACKGROUND

Various electromagnetic (EM) survey techniques exist to perform surveys of subterranean structures for identifying subterranean elements of interest. Examples of subterranean elements of interest include hydrocarbon-bearing reservoirs, gas injection zones, thin carbonate or salt layers, fresh-water aquifers, and so forth. To perform an EM survey, survey receivers are deployed on a surface (such as at the seafloor or on land) in an area of interest to make measurements from which information about the subterranean structure can be derived.

SUMMARY

In general, according to some embodiments, a method of characterizing a subterranean structure includes receiving first electromagnetic data acquired for the subterranean structure using a first survey technique, and receiving second electromagnetic data acquired for the subterranean structure using a second, different survey technique in which static positioning of at least one electromagnetic source is employed. The first and second electromagnetic data are combined to characterize the subterranean structure.

In general, according to further embodiments, a survey system includes a first arrangement of electromagnetic receivers to measure first electromagnetic data using a first survey technique, and a second arrangement of electromagnetic receivers to measure second electromagnetic data using a second, different survey technique in which static positioning of at least one electromagnetic source is employed. A control system combines the first and second electromagnetic data to produce a representation of a subterranean structure.

In general, according to yet other embodiments, an article comprising at least one machine-readable storage medium stores instructions that upon execution cause a system to receive first electromagnetic data acquired for the subterranean structure using a first survey technique, receive second electromagnetic data acquired for the subterranean structure using a second, different survey technique in which static positioning of at least one electromagnetic source is employed, and combine the first and second electromagnetic data to characterize the subterranean structure.

In alternative or further implementations, the first electromagnetic data is acquired using a towed source survey technique.

In alternative or further implementations, the first electromagnetic data is acquired using a magnetotelluric survey technique.

In alternative or further implementations, the second electromagnetic data is acquired based on providing the at least one electromagnetic source at a static position, activating the at least one electromagnetic source while the at least one electromagnetic source is at the static position, and recording, by at least one electromagnetic receiver, a response to an electromagnetic signal generated due to activation of the at least one electromagnetic source.

In alternative or further implementations, the second electromagnetic data is acquired using the second survey technique in which the at least one electromagnetic source is sequentially moved from static position to static position, and at a particular static position, the at least one electromagnetic source is activated to cause generation of an electromagnetic signal that is detected by at least one electromagnetic receiver.

In alternative or further implementations, the second electromagnetic data includes electromagnetic data measured by a generally vertical antenna of the at least one electromagnetic receiver.

In alternative or further implementations, at least one component of the at least one electromagnetic receiver is adjusted to provide a generally vertical orientation of the generally vertical antenna.

In alternative or further implementations, the first survey technique is performed sequentially with the second survey technique.

In alternative or further implementations, the first survey technique is performed in parallel with the second survey technique.

In alternative or further implementations, third electromagnetic data acquired using a third survey technique that is different from the first and second survey techniques is received, wherein the combining comprises combining the first, second, and third electromagnetic data.

In alternative or further implementations, the first electromagnetic data comprises controlled source electromagnetic data, and the third electromagnetic data comprises magnetotelluric data.

In alternative or further implementations, the electromagnetic source is a vertical electromagnetic source having a first electrode and a second electrode that is vertically spaced apart from the first electrode.

In alternative or further implementations, the first and second electrodes are vertically spaced apart by 100 meters or greater.

In alternative or further implementations, at least a particular one of the electromagnetic receivers in the second arrangement has at least a generally vertical antenna having a length of 5 meters or greater.

Other or alternative features will become apparent from the following description, from the claims, and from the drawings.

BRIEF DESCRIPTION OF THE DRAWINGS

Some embodiments are described with respect to the following figures.

DETAILED DESCRIPTION

Different electromagnetic survey techniques exist for acquiring electromagnetic (EM) data (electric field data and/or magnetic field data) that includes a response of a subterranean structure to electromagnetic signals. The acquired EM data can be used for characterizing a subterranean structure, such as for purposes of identifying subterranean elements of interest in the subterranean structure. Examples of subterranean elements of interest include hydrocarbon-bearing reservoirs, gas injection zones, thin carbonate or salt layers, freshwater aquifers, and so forth.

One type of EM survey technique is the magnetotelluric (MT) survey technique that employs EM receivers to make EM measurements that are responsive to naturally occurring electromagnetic signals.

Another type of EM survey technique is the controlled source electromagnetic (CSEM) survey technique, in which a controlled EM source (that includes an EM transmitter) is activated to generate EM signals. The generated EM signals are propagated into a subterranean structure, and EM receivers are employed to measure EM signals affected by the subterranean structure.

Some EM survey techniques may not be sensitive to relatively deep subterranean elements of interest, such as those at or greater than 3,000 meters. Also, certain EM survey techniques may not be as sensitive to relatively small subterranean elements of interest. In accordance with some implementations, for improved robustness and greater accuracy, EM data acquired using multiple different types of EM survey techniques can be combined to characterize a subterranean structure, such as by developing a representation (e.g. model, image, etc.) of the subterranean structure.

Figure 1:
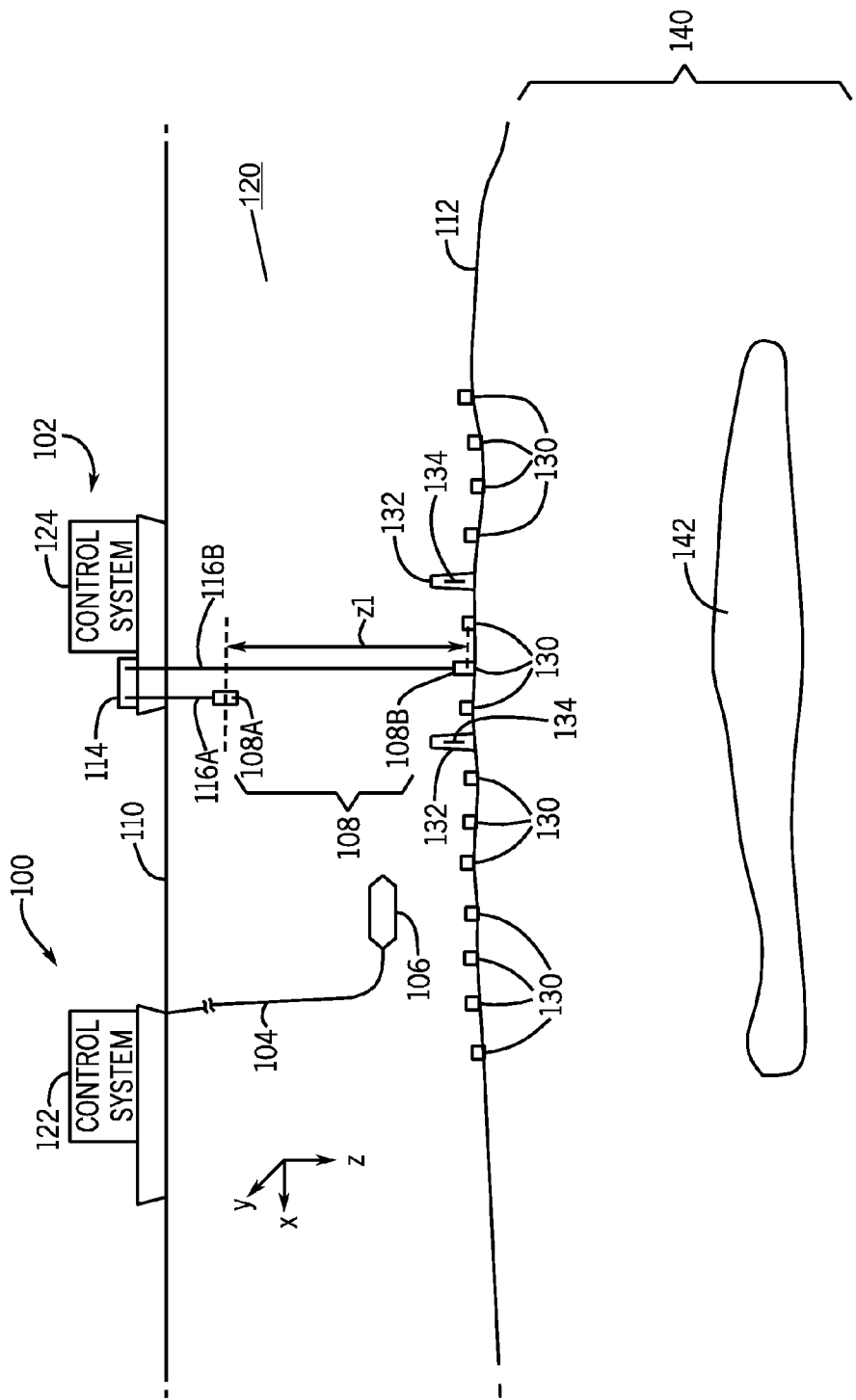
FIG. 1 illustrates an example marine survey arrangement that incorporates some implementations.

FIG. 1 is a schematic diagram of an example combined survey system for acquiring EM data using different EM survey techniques. In examples according to FIG. 1, multiple surface vessels 100 and 102 are used, where the surface vessel 100 is used to perform a towed source survey technique (e.g. towed CSEM survey technique), while the surface vessel 102 is used to perform a "vertical source" EM survey technique. Although examples according to FIG. 1 employ two surface vessels 100 and 102 to perform respective different EM survey techniques, in other examples, a single surface vessel, or more than two surface vessels, can be used to perform different EM survey techniques.

The surface vessel 100 tows, using a tow cable 104, one or more EM sources 106 (although just one EM source 106 is shown in FIG. 1, note that multiple EM sources 106 can be used in other examples). In some examples, the EM source 106 includes an electric dipole formed of a pair of electrodes. The EM source 106 can also include a magnetic dipole. When activated, the EM source 106 produces an electric field along a particular direction. The particular direction can be a generally horizontal direction (x or y direction in FIG. 1, where the x direction is generally perpendicular to the y direction), for example. In other examples, the particular direction can be a different direction, such as a generally vertical direction (represented as z in FIG. 1) or some other direction. The x direction is also referred to as the inline direction (direction generally parallel to the tow motion of the surface vessel 100), while the y direction is also referred to as the crossline direction, which is generally perpendicular to the inline direction.

The discussion herein refers to a given element (e.g. an electric field, a dipole, an antenna, etc.) being "generally" in a target orientation (e.g. generally in a particular direction, generally parallel to the particular direction, or generally perpendicular to the particular direction). A given element being "generally" in the target orientation can refer to the given element either (1) being exactly in the target orientation, or (2) being approximately in the target orientation (the element may not be exactly in the target orientation due to manufacturing or placement tolerances, which can prevent exact alignment in the target orientation).

The surface vessel 102 employs a "vertical source" 108, which includes a first electrode 108A and a second electrode 108B that are vertically spaced apart from each other. Although reference is made to a "vertical source" 108, note that the source 108 may not be exactly vertical, since there is a relatively small amount of lateral offset (in the horizontal direction) between the electrodes 108A and 108B. In some examples, the first electrode 108A ("surface electrode") is located relatively close (within 50 meters for example) of a water surface 110 on which the surface vessel 102 is located. The second electrode 108B ("bottom electrode") is located at or relatively close to a water bottom surface 112 (e.g. seafloor). The second electrode 108B is "relatively close" to the water bottom surface 112 if the second electrode 108B is within a predefined vertical distance (e.g. 50 meters) of the water bottom surface 112.

The vertical offset (z1) between the electrodes 108A and 108B can be relatively large, such as greater than or equal to 100 meters. Alternatively, the vertical offset (z1) can be 500 meters or greater. In other examples, the vertical offset (z1) can be 1,000 meters or greater, 2,000 meters or greater, and so forth.

The electrodes 108A and 108B are deployed on respective support cables 116A and 116B into the body of water 120. The support cables 116A and 116B are unwound from respective drums (not shown) in a frame 114 on the surface vessel 102. After a survey operation has been completed, the frame can wind the electrodes 108A and 108B back to the surface vessel 102.

Although just one vertical source 108 is depicted in FIG. 1 as being deployed from the surface vessel 102, it is noted that in different examples, the surface vessel 102 can deploy multiple vertical sources from the surface vessel 102.

In different examples, instead of deploying the towed EM source 106 and the vertical source 108 using two respective surface vessels, both the towed EM source 106 and the vertical source 108 can be deployed from a common surface vessel.

As further depicted in FIG. 1, each surface vessel 100 and 102 includes a respective control system 122 and 124. The control systems 122 and 124 include respective signal generators to cause signals to be emitted by the respective EM source 106 and vertical source 108.

FIG. 1 also shows EM receivers arranged at the water bottom surface 112. The EM receivers include a first pattern of EM receivers 130 for detecting the EM response of a subterranean structure 140 to EM signals produced by the towed EM source 106. Each of at least some of the EM receivers 130 can include EM sensing elements in multiple orientations (e.g. horizontal orientation and vertical orientation) to measure horizontal and vertical electric or magnetic fields. In other examples, an EM receiver 130 can include a sensing element along just one orientation. The EM receivers 130 can measure at least two horizontal fields that are generally perpendicular to each other. The EM receivers 130 can also measure EM fields in the vertical direction.

The arrangement that includes the first pattern of EM receivers 130 and the towed EM source 106 allows for the performance of a towed CSEM survey technique.

FIG. 1 also shows a second pattern of EM receivers 132 at the water bottom surface 112 that are configured to measure EM signals generated by the vertical source 108. Each of the EM receivers 132 has a relatively long vertical antenna 134 to measure a respective vertical electric field. A relatively long vertical antenna 134 can have a length of 5 meters or greater, or 10 meters or greater, in some examples.

The arrangement that includes the second pattern of EM receivers 132 and the vertical source 108 allows for performance of the vertical source EM survey technique.

With the vertical source EM survey technique, static positioning of at least one EM source, including the vertical source 108, is employed. Static positioning of an EM source refers to an acquisition mode in which the EM source is maintained in a static position during acquisition of EM data. In this static position, the EM source is activated for some predefined time interval (e.g. an hour, multiple hours, a few minutes, etc.). An EM source being at a "static position" refers to the EM source being generally in a predefined vicinity of a target position—although an operator may wish to maintain the EM source fixed at a position without any deviation, that may not actually occur in practice due to environmental factors such as water currents and other causes.

Activation of the EM source 108 during the predefined time interval while the EM source is at a static position includes controlling the EM source to produce a pulse (or a sequence of pulses), where each pulse is generated by energizing the EM source for a first time interval, followed by de-energizing the EM source for a second time interval. In other examples, the EM source 108 can be activated in a different manner. More generally, the EM source 108 can produce a time-varying EM signal.

Once acquisition has been completed with the EM source at a first static position, the EM source can then be moved to a next static position, and the acquisition can be repeated. This can iteratively be performed for as many static positions as desired.

During operation, the towed CSEM survey technique and vertical source EM survey technique can be performed at different times (sequentially) to avoid interference between the two techniques. For example, the towed CSEM survey technique can be performed first, followed by the vertical source EM survey technique, or vice versa.

Alternatively, the towed CSEM survey technique and vertical source EM survey technique can be performed in parallel (concurrently), provided that the surface vessels 100 and 102 are sufficiently far apart such that the EM signals generated by one of the EM survey techniques does not interfere with data acquisition by the other of the EM survey techniques.

The EM receivers 130 and 132 record the EM responses of the subterranean structure to respective EM fields produced by the towed EM source 106 and vertical source 108. The recorded EM responses (in the form of measured EM data) are later obtained from the EM receivers 130 and 132 (such as by retrieving the EM receivers 130 and 132 to the respective surface vessels 100 and 102). Alternatively, the measured EM data can be communicated over a communications link (wired and/or wireless) to the respective control systems 122 and 124 on the surface vessels 100 and 102.

The obtained EM data acquired using the towed CSEM survey technique and the vertical source EM survey technique can then be combined, such as by using joint inversion, to characterize the subterranean structure 140. Characterizing the subterranean structure 140 allows a survey operator to identify one or more subterranean elements 142 of interest that are in the subterranean structure 140.

In alternative implementations, the surface vessel 100 and the associated towed EM source 106 can be omitted. In such implementations, the EM receivers 130 can be used to perform MT surveying, in which the EM receivers 130 measure responses of the subterranean structure 140 to naturally occurring EM fields.

In some implementations, the EM receivers 130 and 132 can continually measure EM signals and can measure and record the responses to EM fields generated by multiple survey systems that perform different EM survey techniques, e.g. the vertical source EM survey technique and either or both of the CSEM survey technique or MT survey technique. As a result, in such implementations, both sets of receivers 130 and 132 contain data recorded due to signals generated by the multiple survey systems that perform the different survey techniques. The recorded data may first be separated by using a control system into separate data sets (that correspond to the respective different survey techniques) and then processed.

Figure 2:
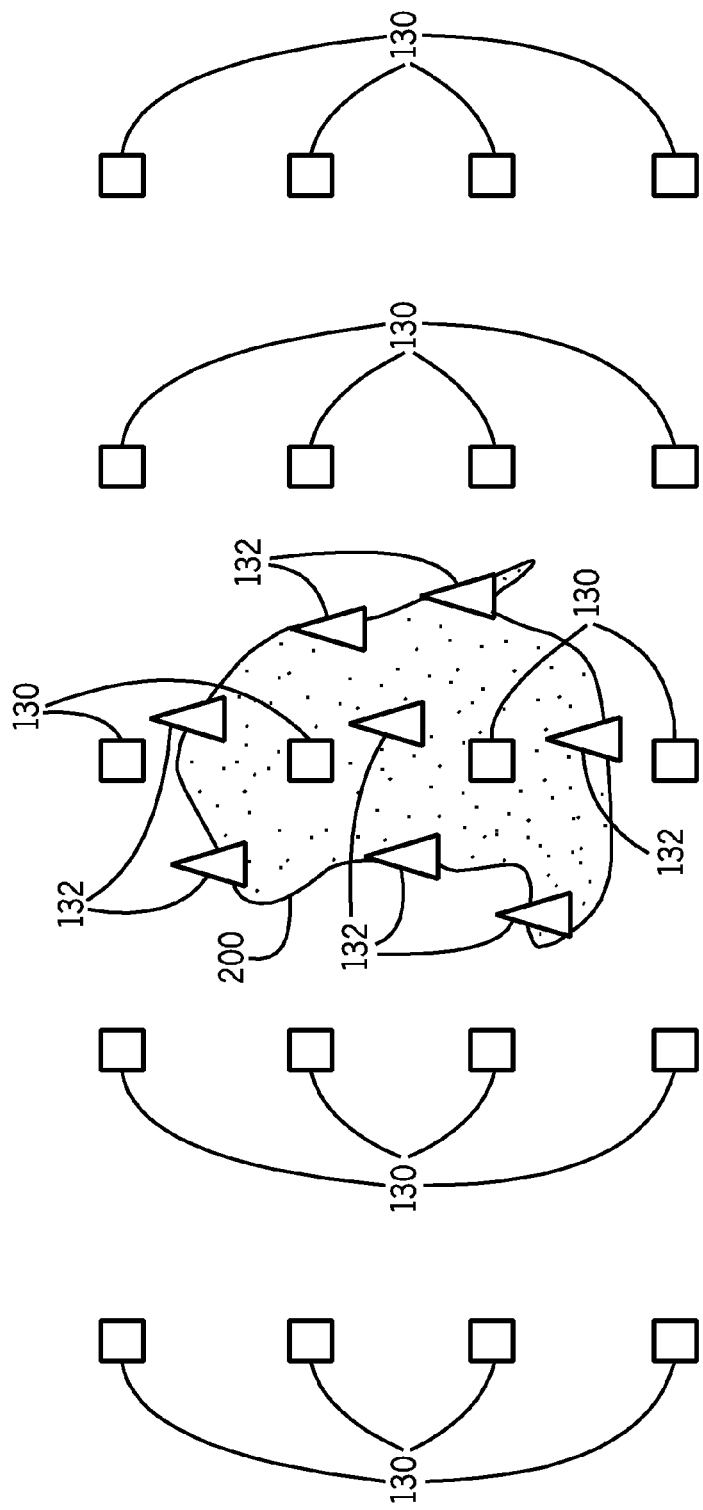
FIG. 2 is a top, schematic view of example patterns of electromagnetic receivers, according to some implementations.

FIG. 2 is a top, schematic view of the patterns of EM receivers 130 and 132. Although the pattern of EM receivers 130 (for performing a towed CSEM survey technique or MT survey technique) is depicted as an array, it is noted that in other examples the pattern of EM receivers 130 can be different. Also, even though FIG. 2 shows that there are a larger number of EM receivers 130 than there are EM receivers 132 (for the vertical source survey technique), alternative examples can employ different numbers of EM receivers 130 and 132.

FIG. 2 shows an area of interest (200), which can correspond to the subterranean element of interest 142 shown in FIG. 1. Measurements collected by the EM receivers 130 and 132 can be combined to characterize the area of interest 200 in the subterranean structure 140.

Figure 3:
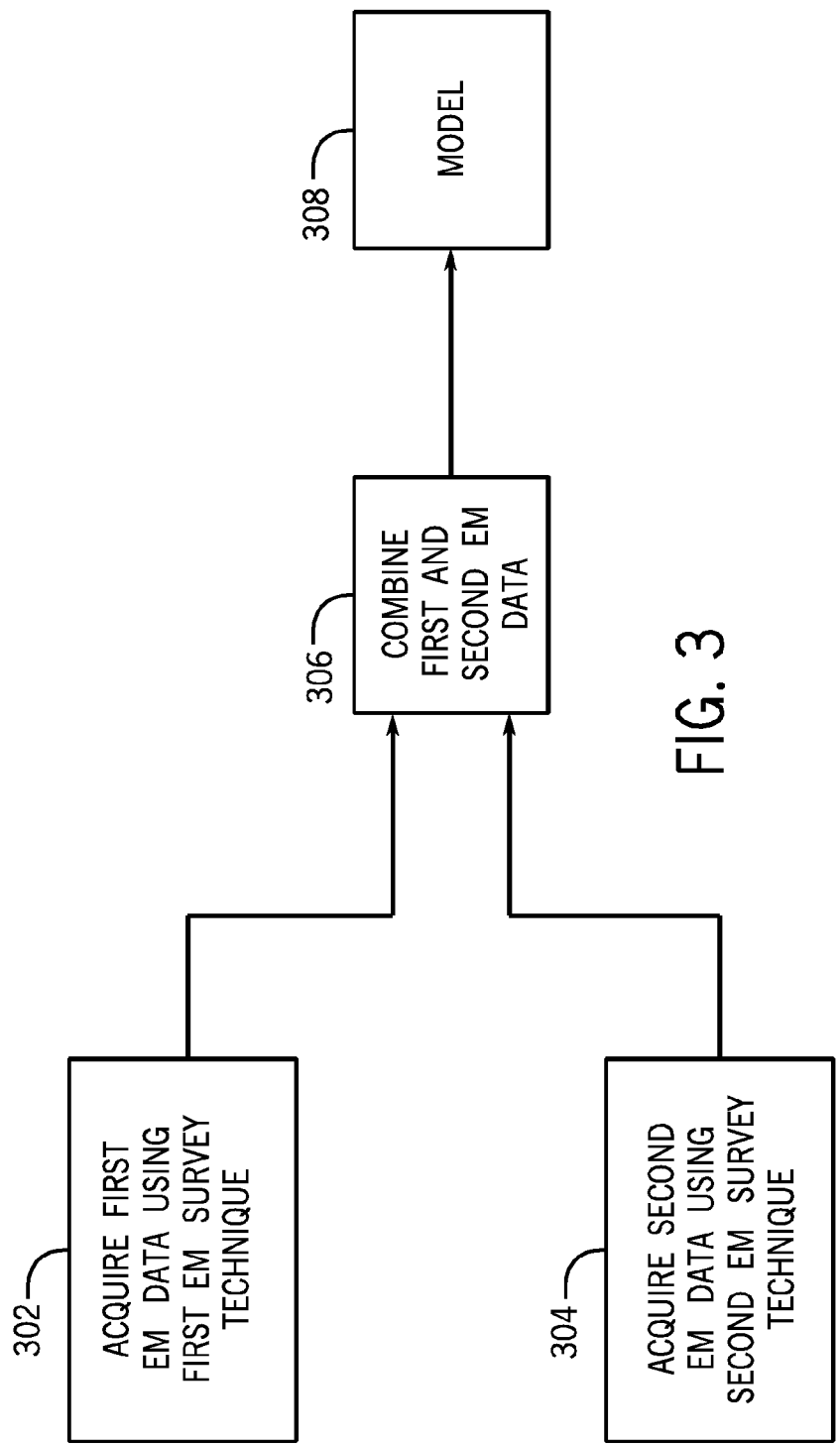
FIG. 3 is a flow diagram of an example process according to some implementations.

FIG. 3 is a flow diagram of an example process of a survey system according to some implementations. The survey system acquires (at 302) first EM data for the subterranean structure 140 (FIG. 1) using a first EM survey technique. This first EM survey technique can be a towed CSEM survey technique, performed using the surface vessel 100, towed EM source 106, and EM receivers 130 (FIG. 1) according to some implementations. Alternatively, the first EM survey technique can be an MT survey technique, performed with the EM receivers 130 but without any active EM source (such as source 106 in FIG. 1). As yet another alternative, both the towed CSEM survey technique and the MT survey technique can be performed to acquire respective EM data.

As further shown in FIG. 3, the survey system further acquires (at 304) second EM data for the subterranean structure 140 using a second EM survey technique that is of a type different from the first EM survey technique. The second EM survey technique can be the vertical source EM survey technique discussed above, performed with the surface vessel 102, vertical source 108, and EM receivers 132 of FIG. 1. As noted above, such EM survey technique employs static positioning of at least one EM source, such as the vertical source 108.

Next, the first electromagnetic data and second electromagnetic data are combined (at 306). The combining of the first and second electromagnetic data can be performed by a control system, such as control system 122 or 124 in FIG. 1, or by another control system. In some implementations, the combining of the first and second electromagnetic data employs a joint inversion technique. Joint inversion refers to an algorithm that generates a model (308 in FIG. 2) based on multiple different types of observed data, in this case the first and second EM data discussed above. The generated model 308 is a model of the subterranean structure 140, where the model 308 can include parameters representing characteristics (e.g. resistivity and/or other characteristics) of the subterranean structure 140. p In some examples, the joint inversion technique can be a three-dimensional (3D) joint inversion technique to produce a 3D model, such as a 3D resistivity volume. The model 308 that is produced can be used for producing a simulation model that can be used for performing simulation; in other examples, the model 308 can be used for other purposes.

The joint inversion technique can be an iterative technique in which the model 308 that is generated is iteratively updated until a stopping criterion is satisfied. The iterative updating of the model 308 allows a higher quality model to be generated. Examples of joint inversion techniques that can be employed include joint inversion techniques described in Mackie et al., "Joint 3D Inversion of Marine CSEM and MT Data," Extended Abstracts, SEG Annual Meeting, 2007; or Abubakar et al., "Joint MT and CSEM Data Inversion Using a Multiplicative Cost Function Approach," Geophysics, Vol. 76,No. 3,May 2011 Such example joint inversion techniques are modified to accept as inputs EM data acquired using the vertical source EM survey technique and one or both of EM data acquired using a CSEM survey technique and EM data acquired using an MT survey technique.

During the joint inversion process, results from one of the different EM survey techniques can be used as a constraint on the inversion based on the other one of the EM survey techniques. This allows for the generation of a more refined model.

Although FIG. 3 shows the combining of EM data acquired using two different EM survey techniques, in alternative implementations, the process can combine EM data acquired using a towed CSEM survey technique, an MT survey technique, and a vertical source EM survey technique.

Figure 4:
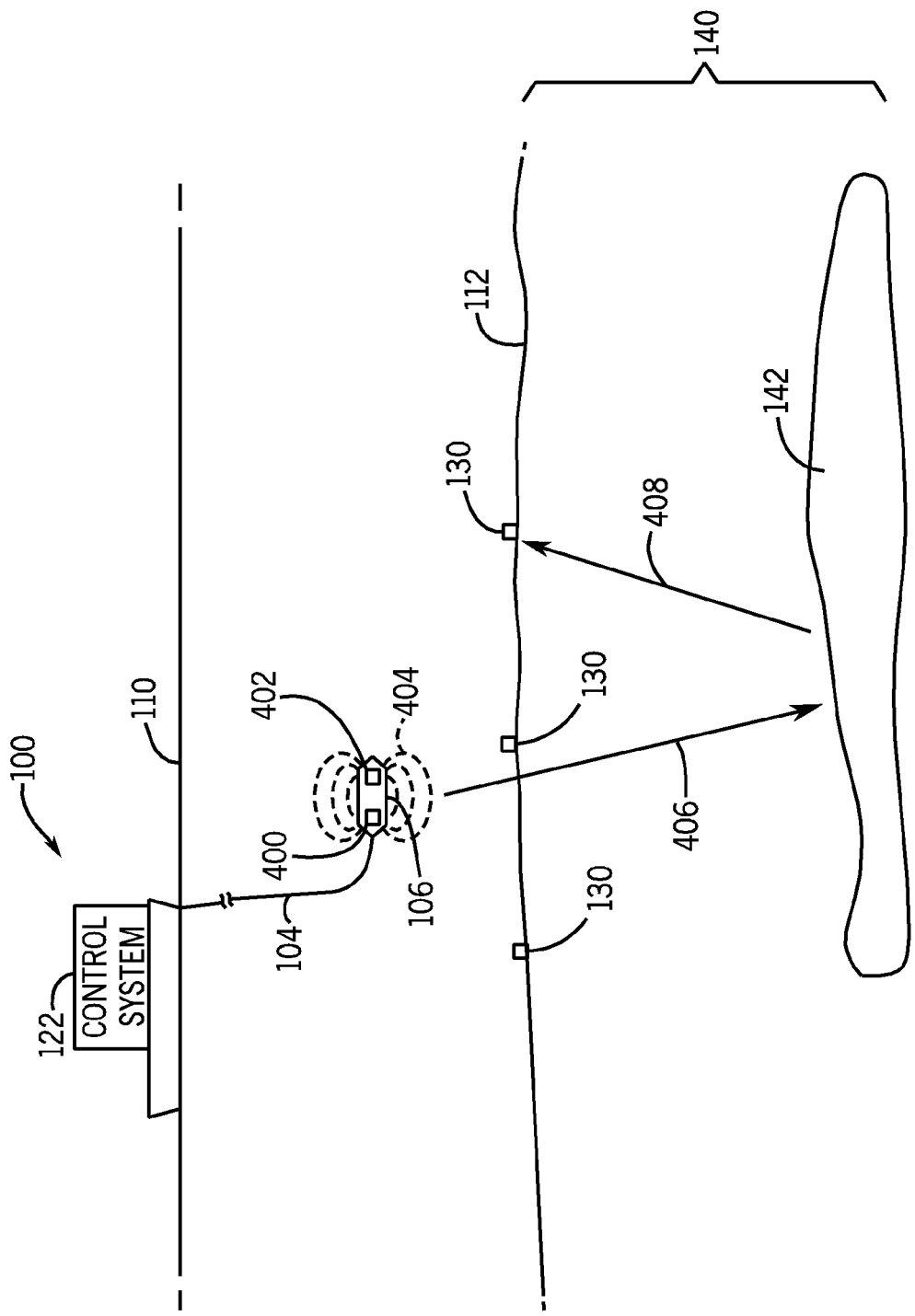
FIGS. 4 and 5 illustrate different electromagnetic survey techniques, according to some examples.

FIG. 4 illustrates an example towed CSEM survey arrangement that includes the surface vessel 100, towed EM source 106, and EM receivers 130. The towed EM source 106 includes a pair of electrodes 400 and 402 that are laterally spaced apart to form a horizontal dipole. The horizontal dipole generates EM fields 404 as depicted in FIG. 4. The EM fields are propagated (406) into the subterranean structure 140, and the responses (408) of the subterranean structure to the generated EM fields are detected by the EM receivers 130.

The towed EM source 106 can be positioned near the seafloor 112. The EM receivers 130 measure EM data over relatively long offsets between the towed EM source 106 and the respective EM receivers 130. An offset refers to the lateral (horizontal) distance between the source 106 and a receiver 130. Examples of such relatively long offsets can be in the range of 6 kilometers (km) to 10 km, although other ranges can be used in other examples. The towed CSEM survey technique can provide better vertical resolution than horizontal resolution of a subterranean element.

Figure 5:
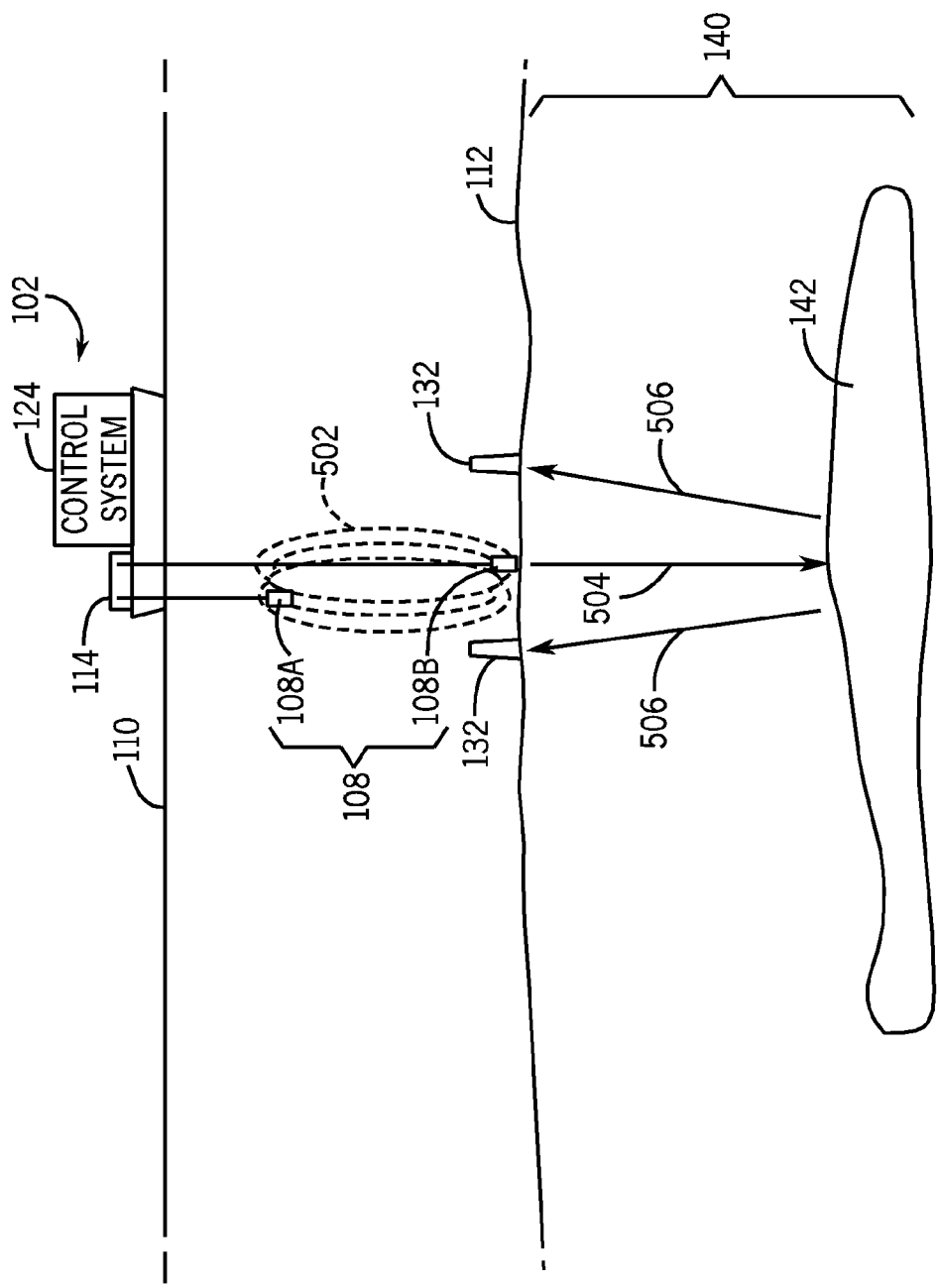

FIG. 5 illustrates an example vertical source EM survey arrangement that includes the surface vessel 102, vertical source 108, and EM receivers 132. The vertical dipole formed by the vertically spaced apart electrodes 108A and 108B generate EM fields 502, which are propagated (504) into the subterranean structure 140. The responses (506) of the subterranean structure to the generated EM fields are detected by the EM receivers 132. The vertical source EM survey technique can provide better horizontal resolution than vertical resolution of a subterranean element.

Figure 6:
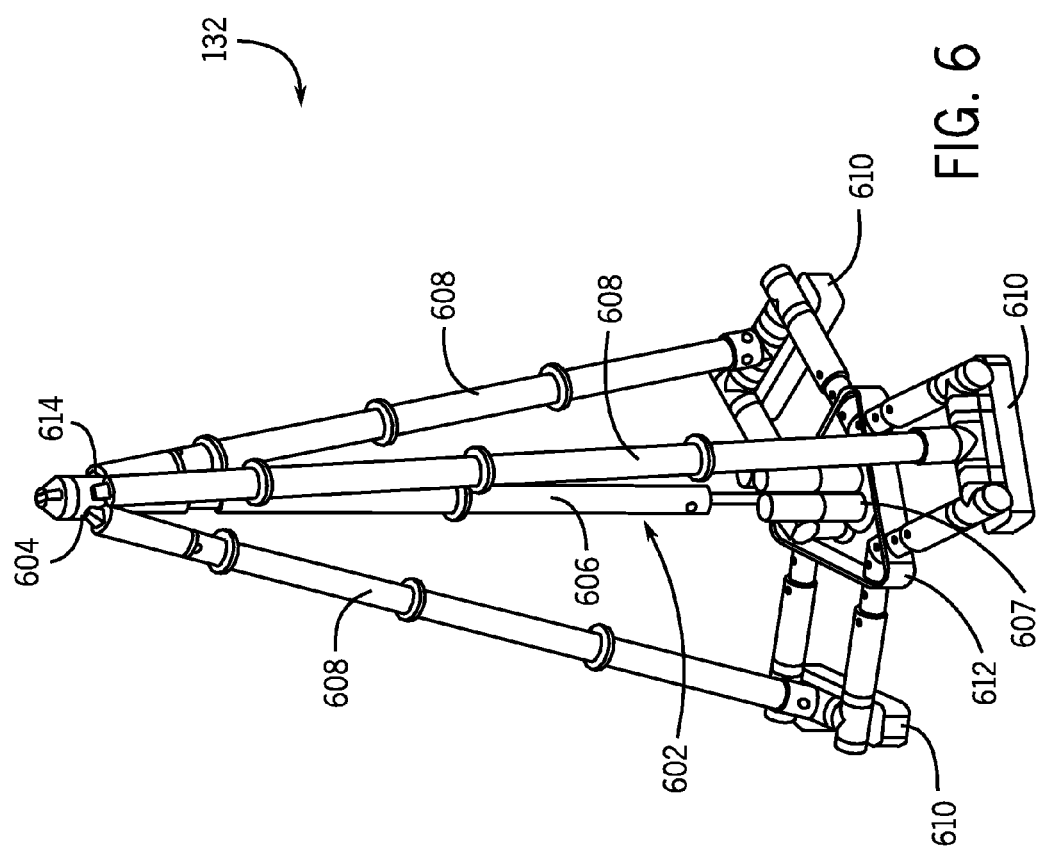
FIG. 6 is a side, perspective view of an example electromagnetic receiver used in a vertical source electromagnetic survey technique, according to some implementations.

FIG. 6 illustrates an example of an EM receiver 132 used in the vertical source EM survey technique. The EM receiver 132 includes a generally vertical dipole 602 that has a first electrode 604 and a second electrode 607, which are electrically connected by wire(s) extending through a mast 606. The generally vertical dipole 602 provides a generally vertical antenna. The EM receiver 132 has a support structure that includes legs 608 (three in the example shown). The legs 608 are each connected to a respective support foot 610, where the support foot 610 is configured to be placed on a seafloor or other surface.

The support feet 610 are coupled to a base 612, which can include electronic equipment, including a storage device (to store measured EM data) and a communications device (to communicate the stored measured EM data to another device). The base 612 can also include equipment to adjust a position of the mast 606 and to adjust lengths of the legs 608. The legs 608 can telescope to different lengths.

The lower end portion of the mast 606 is coupled to the base 612. The upper end portion of the mast 606 is attached to a pivot joint 614 to allow the mast 606 to be pivotably mounted in the support structure of the EM receiver 132. Once the EM receiver 132 is deployed on a seafloor or other surface, the lengths of the legs 608 and the relative position of the mast 606 with respect to the base 612 can be adjusted to achieve a vertical orientation of the dipole 602.

As noted above, in some implementations, the length of the vertical dipole 602 can be 5 meters or greater, or 10 meters or greater, in some examples. In other examples, the vertical dipole 602 can have other lengths. The relatively long length of the vertical dipole 602 allows the vertical source EM survey technique to look deeper into the subterranean structure 140 (FIG. 1). This ability to look deeper into the subterranean structure in combination with the increased horizontal resolution of the vertical source EM survey technique enhances the ability to identify smaller features at greater depths in the subterranean structure.

By providing a combined survey system that combines different EM survey techniques to acquire EM data to produce a representation of a subterranean structure, more accurate results can be obtained. For example, the greater vertical resolution provided by a towed CSEM survey technique in combination with the greater horizontal resolution provided by a vertical source EM survey technique allow for improved resolution in multiple directions. This can allow the surveying to be more sensitive to both thicknesses and edges of subterranean elements of interest.

Additionally, the combined survey system can be more efficiently implemented. An existing towed CSEM survey system can be used together with the vertical source EM survey system to implement the combined survey system.

Figure 7:
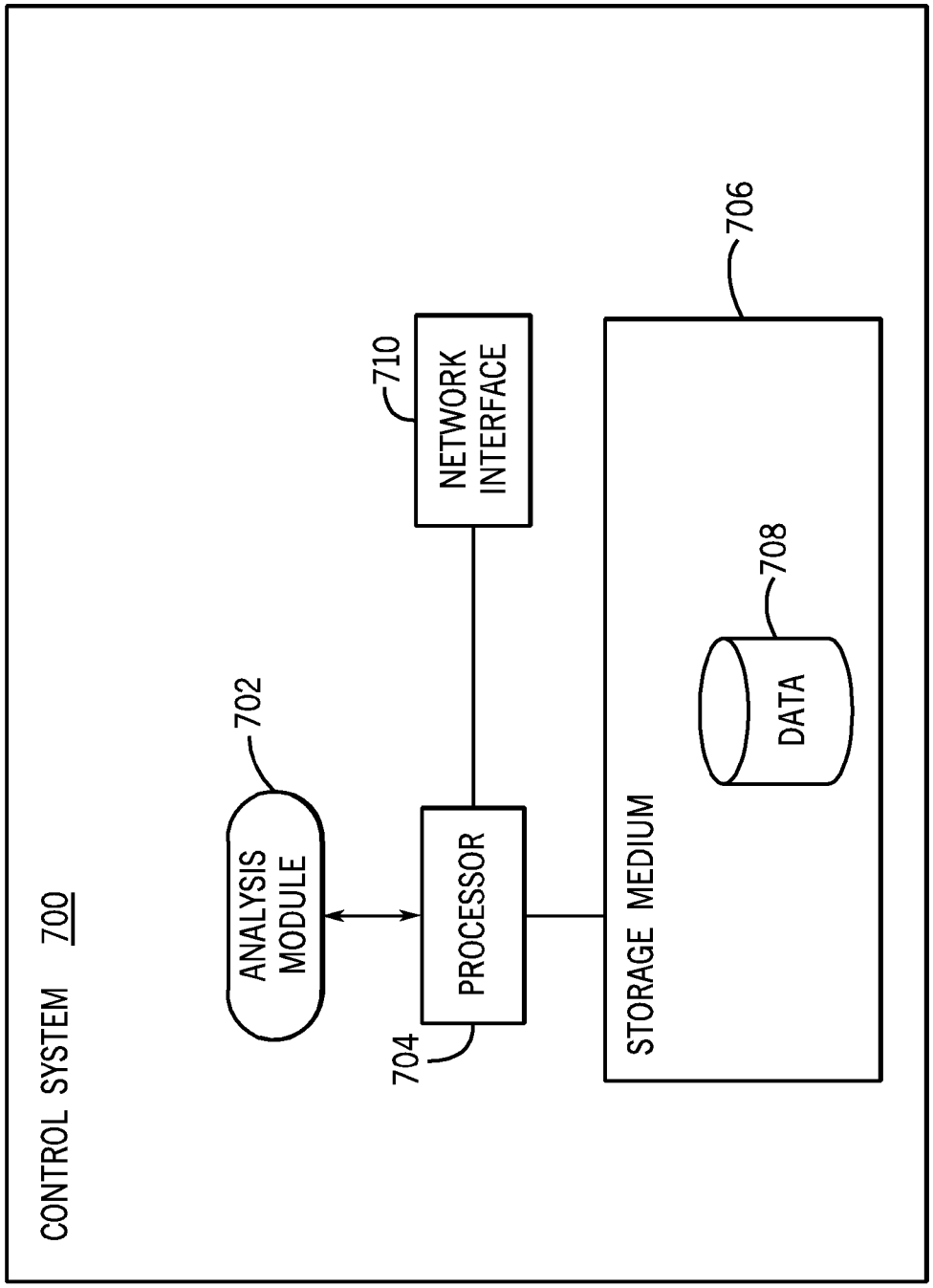
FIG. 7 is a block diagram of an example control system according to some implementations.

FIG. 7 is a block diagram of an example control system 700 according to some implementations. The control system 700 can be one of control systems 122 and 124 (FIG. 1), or a different control system. The control system includes an analysis module 702 to perform various tasks discussed above, including the receiving of EM data acquired using different EM survey techniques and the combining (e.g. joint inversion) of such EM data to produce a representation of a subterranean structure. The analysis module 702 (which can be implemented as machine-readable instructions) is executable on one or multiple processors 704. A processor can include a microprocessor, microcontroller, processor module or subsystem, programmable integrated circuit, programmable gate array, or another control or computing device.

The control system 700 includes a storage medium 706 (or storage media) to store data, such as EM data 708 acquired using the different EM survey techniques discussed above. In addition, the control system 700 includes a network interface 710 to allow the control system 700 to communicate over a network.

The storage medium (or storage media) 706 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of characterizing a subterranean structure, comprising:
   receiving first electromagnetic data acquired for the subterranean structure using a first survey technique;
   receiving second electromagnetic data acquired for the subterranean structure using a second, different survey technique in which static positioning of at least one electromagnetic source in a body of water is employed, wherein receiving the second electromagnetic data acquired using the static positioning comprises receiving the second electromagnetic data acquired based on providing the at least one electromagnetic source at a static position, for a time interval during which the at least one electromagnetic source is activated, and a response to an electromagnetic signal generated due to the activation of the at least one electromagnetic source is measured by at least one electromagnetic receiver; and
   combining the first and second electromagnetic data to characterize the subterranean structure.

2. The method of claim 1, wherein receiving the first electromagnetic data comprises receiving the first electromagnetic data acquired using a towed source survey technique.

3. The method of claim 1, wherein receiving the first electromagnetic data comprises receiving the first electromagnetic data acquired using a magnetotelluric survey technique.

4. The method of claim 1, wherein receiving the second electromagnetic data acquired using the second survey technique comprises receiving the second electromagnetic data acquired using the second survey technique in which the at least one electromagnetic source is sequentially moved from static position to static position.

5. The method of claim 1, wherein the second electromagnetic data includes electromagnetic data measured by a generally vertical antenna of the at least one electromagnetic receiver.

6. The method of claim 5, further comprising adjusting at least one component of the at least one electromagnetic receiver to provide a generally vertical orientation of the generally vertical antenna.

7. The method of claim 1, further comprising performing the first survey technique sequentially with the second survey technique.

8. The method of claim 1, further comprising performing the first survey technique in parallel with the second survey technique.

9. The method of claim 1, further comprising:
   receiving third electromagnetic data acquired using a third survey technique that is different from the first and second survey techniques,
   wherein the combining comprises combining the first, second, and third electromagnetic data.

10. The method of claim 9, wherein the first electromagnetic data comprises controlled source electromagnetic data, and the third electromagnetic data comprises magnetotelluric data.

11. The method of claim 1, wherein the activation of the at least one electromagnetic source comprises, during the time interval, energizing the at least one electromagnetic source followed by de-energizing the at least one electromagnetic source.

12. A survey system comprising:
    a first arrangement of electromagnetic receivers to measure first electromagnetic data using a first survey technique;
    a second arrangement of electromagnetic receivers to measure second electromagnetic data using a second, different survey technique in which static positioning of at least one electromagnetic source in a body of water is employed, wherein the static positioning of the at least one electromagnetic source comprises maintaining the at least one electromagnetic source at a static position for a time interval during which the at least one electromagnetic source is activated and an electromagnetic response to the activation of the at least one electromagnetic source is measured by the second arrangement of electromagnetic receivers;
    wherein the first and second arrangements of electromagnetic receivers are to communicate the respective first and second electromagnetic data to a control system that combines the first and second electromagnetic data to produce a representation of a subterranean structure.

13. The survey system of claim 12, further comprising:
    the at least one electromagnetic source, wherein the at least one electromagnetic source is to be statically positioned during acquisition of the second electromagnetic data.

14. The survey system of claim 13, wherein the electromagnetic source is a vertical electromagnetic source having a first electrode and a second electrode that is vertically spaced apart from the first electrode.

15. The survey system of claim 14, wherein the first and second electrodes are vertically spaced apart by 100 meters or greater.

16. The survey system of claim 12, wherein at least a particular one of the electromagnetic receivers in the second arrangement has at least a generally vertical antenna having a length of 5 meters or greater.

17. The survey system of claim 12, wherein the measured first electromagnetic data is to be acquired using the first survey technique that includes a technique selected from the group consisting of a towed source survey technique and a magnetotelluric survey technique.

18. An article comprising at least one non-transitory machine-readable storage medium storing instructions that upon execution cause a system to:
receive first electromagnetic data acquired for a subterranean structure using a first survey technique;
receive second electromagnetic data acquired for the subterranean structure using a second, different survey technique in which static positioning of at least one electromagnetic source in a body of water is employed, wherein the static positioning of the at least one electromagnetic source comprises maintaining the at least one electromagnetic source at a static position for a time interval during which the at least one electromagnetic source is activated, and an electromagnetic response to the activation of the at least one electromagnetic source is measured; and
combine the first and second electromagnetic data to characterize the subterranean structure.

19. The article of claim 18, wherein receiving the first electromagnetic data comprises receiving the first electromagnetic data acquired using a technique selected from the group consisting of a towed source survey technique and a magnetotelluric survey technique.

* * * * *